US010018522B2

(12) United States Patent
Yamada et al.

(10) Patent No.: US 10,018,522 B2
(45) Date of Patent: Jul. 10, 2018

(54) RESIDUAL STRESS MEASURING METHOD

(71) Applicant: KOBE STEEL, LTD., Kobe-shi (JP)

(72) Inventors: Mariko Yamada, Takasago (JP); Keisuke Okita, Kobe (JP); Kenji Murakami, Takasago (JP); Masahiro Miyagawa, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 85 days.

(21) Appl. No.: 15/033,805

(22) PCT Filed: Nov. 6, 2014

(86) PCT No.: PCT/JP2014/079458
§ 371 (c)(1),
(2) Date: May 2, 2016

(87) PCT Pub. No.: WO2015/072391
PCT Pub. Date: May 21, 2015

(65) Prior Publication Data
US 2016/0273979 A1 Sep. 22, 2016

(30) Foreign Application Priority Data

Nov. 14, 2013 (JP) .................................. 2013-236300

(51) Int. Cl.
G01L 1/22 (2006.01)
G01L 5/00 (2006.01)
G01M 5/00 (2006.01)

(52) U.S. Cl.
CPC .............. *G01L 1/22* (2013.01); *G01L 5/0047* (2013.01); *G01M 5/0041* (2013.01); *G01M 5/0058* (2013.01)

(58) Field of Classification Search
CPC .................................................. G01L 5/0047
See application file for complete search history.

(56) References Cited

U.S. PATENT DOCUMENTS 4,823,608 A * 4/1989 Satoh ........................ F16G 5/16
73/783
5,164,669 A * 11/1992 Namkung ............... G01L 1/255
324/209

(Continued)

FOREIGN PATENT DOCUMENTS

JP   2003-42859 A   2/2003
JP   2003-194637 A  7/2003

(Continued)

OTHER PUBLICATIONS

International Preliminary Report on Patentability and Written Opinion dated May 17, 2016 in PCT/JP2014/079458 (submitting English language translation only).

(Continued)

*Primary Examiner* — Harshad R Patel
*Assistant Examiner* — Tran M Tran
(74) *Attorney, Agent, or Firm* — Oblon, McClelland, Maier & Neustadt, L.L.P.

(57) ABSTRACT

A method capable of accurately measuring, in an object including a columnar shaft section and a tabular section projecting outward radially beyond an outer circumferential surface of the shaft section, a distribution of residual stress near a fillet surface interconnecting the shaft section and the tabular section. The method includes repeating a measurement cycle, which includes cutting the object to form a new cutting surface and measuring residual stress in a plurality of parts on the cutting surface. The cutting surface is a conical or cylindrical surface concentric with the axis of the shaft section, being through a reference position unchanged in the repeated measurement cycle. The reference position is desirably the center position of an arc of the fillet surface having the largest diameter on the central longitudinal cross-section of the object.

14 Claims, 14 Drawing Sheets

(56) References Cited

U.S. PATENT DOCUMENTS

| | | | | |
|---|---|---|---|---|
| 6,470,756 | B1* | 10/2002 | Prime | G01N 3/00 73/799 |
| 6,851,300 | B2* | 2/2005 | Kwon | G01N 3/48 73/85 |
| 7,053,606 | B2* | 5/2006 | Buttle | G01L 1/12 324/209 |
| 7,100,457 | B2* | 9/2006 | Lee | G01N 19/08 73/114.77 |
| 7,286,893 | B1* | 10/2007 | Mazumder | B23K 26/34 219/121.66 |
| 7,472,603 | B2* | 1/2009 | Kim | G01N 3/42 73/789 |
| 7,516,534 | B2* | 4/2009 | Easterbrook | B21J 15/02 29/509 |
| 7,639,348 | B2* | 12/2009 | Niitsu | G01L 1/241 356/33 |
| 7,739,059 | B2* | 6/2010 | Bianco | G06F 17/5018 702/187 |
| 7,884,924 | B2* | 2/2011 | Numata | G01L 5/0047 356/32 |
| 8,923,480 | B2* | 12/2014 | Wang | G01N 23/20008 378/71 |
| 8,997,577 | B2* | 4/2015 | Sim | G01L 5/0047 73/760 |
| 9,037,420 | B2* | 5/2015 | Takahashi | G01L 5/0047 702/42 |
| 9,696,142 | B2* | 7/2017 | Bamberg | G01B 11/162 |
| 2001/0022873 | A1* | 9/2001 | Kim | G01L 1/242 385/13 |
| 2015/0025815 | A1* | 1/2015 | Sebastiani | G01N 3/08 702/42 |

FOREIGN PATENT DOCUMENTS

| | | |
|---|---|---|
| JP | 2005-181172 A | 7/2005 |
| JP | 2006-284199 A | 10/2006 |
| JP | 2008-39530 A | 2/2008 |
| JP | 2008-298507 A | 12/2008 |
| JP | 2009-48361 A | 3/2009 |
| JP | 2009-216514 A | 9/2009 |
| JP | 2009-236822 A | 10/2009 |
| JP | 2011-252811 | 12/2011 |

OTHER PUBLICATIONS

Extended European Search Report dated May 31, 2017 in Patent Application No. 14862243.4.

Weili Cheng et al., "The Single Slice Method for Measurement of Axisymmetric Residual Stresses in Solid Rods or Hollow Cylinders in the Region of Plane Strain", Transactions of the ASME, Journal of Engineering Materials and Technology, vol. 120, No. 2, XP055373207, Apr. 1998, p. 170-176.

International Search Report dated Jan. 13, 2015 in PCT/JP2014/079458 Filed Nov. 6, 2014.

Nakacho, et al., "Measurement of Welding Residual Stresses by Inherent Strain Method—New Theory for Axial-symmetry and Application for Pipe Joint," Japan Welding Society Transaction, Mar. 2009, vol. 27, No. 1, (10 pages).

* cited by examiner

RESIDUAL STRESS MEASURING METHOD

TECHNICAL FIELD

The present invention relates to a residual stress measuring method.

BACKGROUND ART

It is desired to accurately measure residual stress inside a structure. This is because the residual stress affects the strength and the life of the structure. A strain which causes the residual stress, such as a thermal strain or a plastic strain, is called inherent strain; an inherent strain method for calculating the residual stress from the inherent strain is proposed. The inherent strain method includes measuring a release strain (an elastic strain) caused by release of the residual stress, deriving a distribution of the inherent strain from the measured release strain according to an inverse analysis using a finite element method, and calculating a distribution of the residual stress according to a direct analysis using the finite element method.

For example, as a method of measuring residual stress in a shaft-like member on the basis of the inherent strain method, there is known a T-L method using a measurement piece (a T-piece) obtained by cutting a structure axially thereof and a measurement piece (an L piece) obtained by cutting the structure orthogonally to a cutting direction of the T-piece. Specifically, proposed is a method including measuring respective release strains concerning the T-piece and the L piece, deriving an inherent strain from the release strains using the finite element method in a model on a cylindrical coordinate, and further calculating residual stress (see, for example, Japanese Unexamined Patent Publication No. 2005-181172, "Measurement of Welding Residual Stress by Inherent Strain Method").

The inherent strain method does not always require, because of the principle thereof, directly measuring a release strain of a portion desired to be measured. However, since measurement of a release strain involves an error, measurement of a release strain in a position with higher residual stress in an initial state allows prediction accuracy of residual stress to be improved. It is, therefore, desirable to set a larger number of measurement points in a portion containing a steep gradient of residual stress. However, because of a physical limit in narrowing an interval of cutting an object, the application of the conventional TL method may result in a situation where the portion containing a steep gradient of the residual stress is included in a single T-piece. This may cause calculation accuracy of residual stress to be insufficient depending on the shape of a structure.

The inconvenience is conspicuous especially in the case of measuring residual stress in a structure including a columnar shaft section and a tabular section (a flange) projecting outward radially beyond the outer circumferential surface of the shaft section, wherein a fillet surface for easing stress concentration is provided in a portion interconnecting the shaft section and the tabular section. Specifically, such a structure is likely to have a weakest part in the fillet surface, and therefore there is often applied a surface treatment technique for increasing the strength of the weakest part, that is, the fillet surface. The application of such a surface treatment technique to the fillet surface causes a concentrated distribution of residual stress near the fillet surface. According to the analysis using the cylindrical coordinate model based on the conventional T-L method, inclusion of the entire fillet surface in a single L-piece may cause an inconvenience of failing to analyze a local residual stress distribution near the fillet surface with sufficient accuracy.

CITATION LIST

Patent Literature

Patent Literature 1: Japanese Unexamined Patent Publication No. 2005-181172

Non Patent Literature

Non Patent Literature 1: Keiji Nakacho and five others "Measurement of Welding Residual Stress by Inherent Strain Method", Japan Welding Society Transaction, March 2009, Vol. 27, First Issue, p. 104 to 113

SUMMARY OF INVENTION

It is an object of the present invention to provide a residual stress measuring method capable of accurate measurement of a distribution of residual stress near a fillet surface of an object including a columnar shaft section and a tabular section projecting radially beyond the shaft section, the fillet surface being provided in a portion interconnecting the shaft section and the tabular section.

This method is a method of measuring residual stress in an object that includes a columnar shaft section and a tabular section projecting outward radially beyond an outer circumferential surface of the shaft section over an entire circumference, the object being provided with a fillet surface in a portion interconnecting the shaft section and the tabular section. The method includes repeating a measurement cycle, which includes: a step of cutting the object to thereby form a new cutting surface which is a conical or cylindrical surface concentric with an axis of the shaft section, the conical or cylindrical surface being through a reference position which is unchanged in every repeated measurement cycle; and a step of measuring residual stress in a plurality of parts in the cutting surface.

DESCRIPTION OF EMBODIMENTS

An embodiment of the present invention is explained in detail below with reference to the drawings as appropriate.

[Residual Stress Measuring Method]

Figure 1:
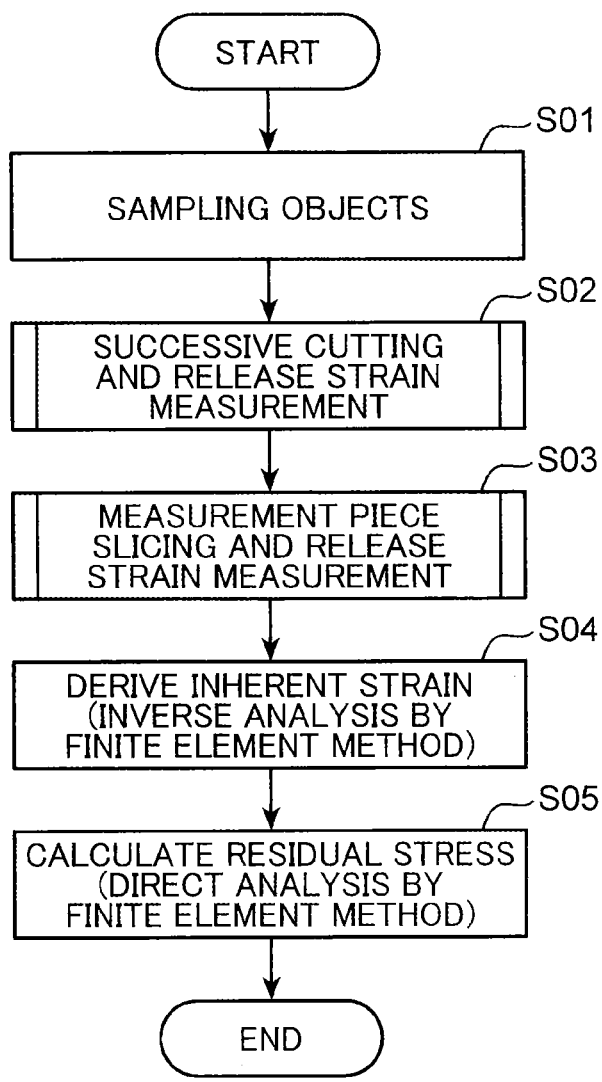
FIG. 1 is a flowchart showing a flow of a residual stress measuring method in an embodiment of the present invention.

FIG. 1 is a flowchart showing a residual stress measuring method for measuring residual stress in a shaft-like member. The residual stress measuring method is explained below in the case of measuring residual stress in a shaft-like member 1 shown in FIG. 2.

The residual stress measuring method includes steps S01, S02, S03, S04, and S05 shown in FIG. 1. Step S01 is an object sampling process for sampling a plurality of objects (test pieces) from the shaft-like member 1, wherein the objects is used in actual measurement. Step S02 is a successive-cutting and release-strain-measuring process for measuring a release strain by successive cutting using a part of the objects. Step S03 is a measurement-piece-slicing and release-strain-measurement process for slicing a measurement piece from the remaining object and performing measurement of a release strain of the measurement piece. Step S04 is an inherent strain derivation process for deriving a distribution of an inherent strain according to an inverse analysis by finite element method from a distribution of the release strain measured in step S03. Finally, step S05 is a residual stress calculation process for calculating a distribution of residual stress according to a direct analysis by finite element method from the distribution of the inherent strain.

Figure 2:
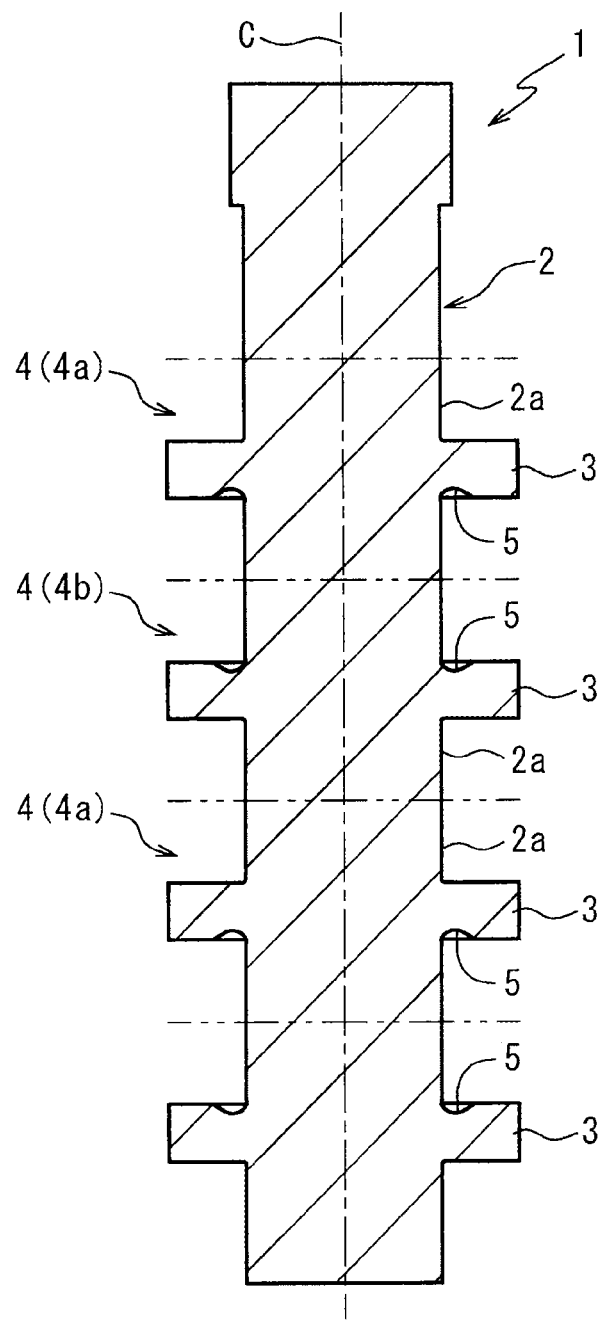
FIG. 2 is a sectional view showing a shaft-like member, residual stress of which is measured by the residual stress measuring method in FIG. 1.

The shaft-like member 1 shown in FIG. 2 includes a columnar shaft 2 and tabular sections 3 projecting outward radially beyond the outer circumferential surface of the shaft 2 over the entire circumference. The shaft-like member 1 is provided with fillet surfaces 5 in connecting portions interconnecting the shaft 2 and the tabular sections 3. Specifically, in the shaft-like member 1 illustrated in FIG. 2, the tabular sections 3 are provided in respective four positions of the shaft 2, the positions being spaced axially of the shaft 2. Each of the tabular sections 3 is formed in a disc shape.

<Object Sampling Process>

In the object sampling process, which is step S01 in FIG. 1, the shaft-like member 1 is cut in positions indicated by alternate long and two short dashes lines in FIG. 2 to thereby cause three objects 4 to be sampled, wherein the objects 4 has the same shape one another and can be regarded as equivalent concerning residual stress. Each of the objects 4 includes a columnar shaft sections $2a$ obtained by dividing the shaft 2 and the tabular body 3 projecting outward radially beyond the outer circumferential surface of the shaft section $2a$ over the entire circumference in the intermediate positions axially of the shaft sections $2a$. The fillet surface 5 is located in each of the connecting portions interconnecting the shaft sections $2a$ and the tabular sections 3. In this embodiment, for convenience, two objects among the three objects 4, being served for successive cutting and release strain measurement in step S02 explained below, are referred to as first objects $4a$, while one object served for measurement piece slicing and release strain measurement in step S03 explained below is referred to as second object $4b$.

<Successive-Cutting and Release-Strain-Measuring Process>

The release strain measuring process by successive cutting, the process being the step s01 in FIG. 1, includes repeating a specific measurement cycle a plurality of times to obtain a release strain. The measurement cycle includes a first step of sequentially forming cutting surfaces 6 shown in FIG. 3 and a second step of slicing small pieces from the cutting surfaces 6 and measuring respective release strains in the small pieces with strain gauges. In the first step, the first object $4a$ is repeatedly cut in accordance with the repetition of the measurement cycle, whereby the cutting surfaces 6 are formed a plurality of times. The respective cutting surfaces 6 are conical or cylindrical surfaces concentric with an axis C of the shaft section $2a$ and having inclination angles with respect to the axis C different from one another by a fixed angle.

Figure 4:
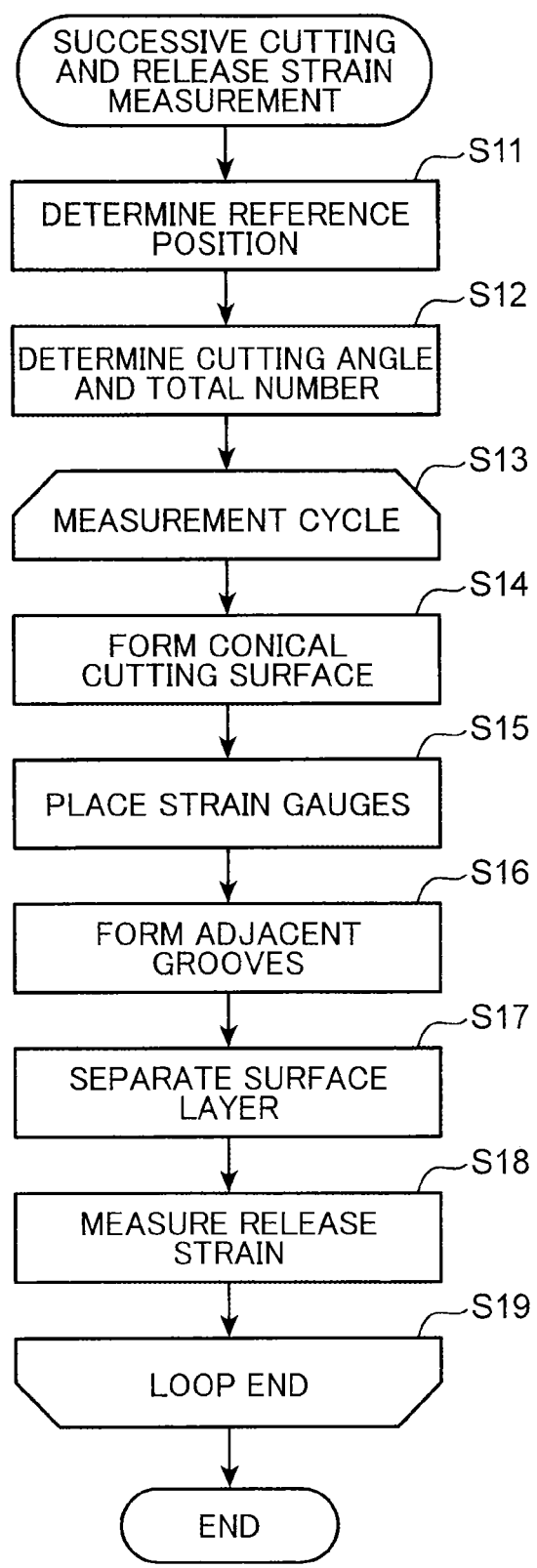
FIG. 4 is a flowchart showing a detailed flow of the successive-cutting and release-strain-measuring process shown in FIG. 1.

FIG. 4 shows a detailed flow of the successive cutting and release strain measurement step in step S02 of FIG. 1. The successive-cutting and release-strain-measuring process includes setting a reference position (step S11), determining a total number of cut angles and measurement cycles (step S12), repeating the measurement cycle by the total number (steps S13 to S19).

Figure 5A:
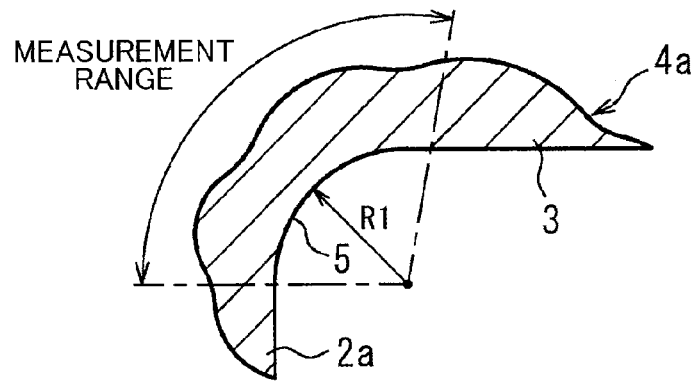
FIG. 5A is a sectional view showing a first example of a reference position determined in a reference position determining process shown in FIG. 4.
Figure 5B:
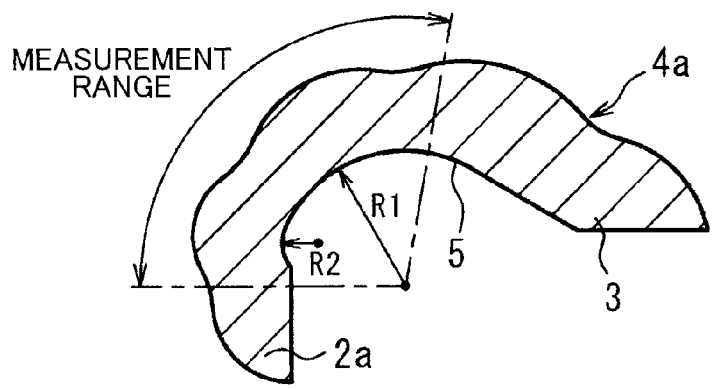
FIG. 5B is a sectional view showing a second example of the reference position determined in the reference position determining process shown in FIG. 4.
Figure 5C:
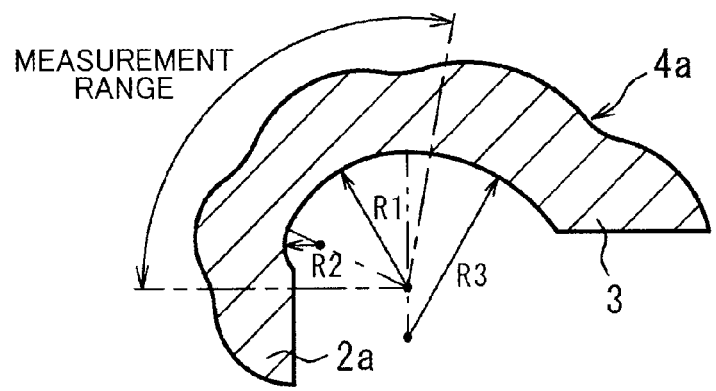
FIG. 5C is a sectional view showing a third example of the reference position determined in the reference position determining process shown in FIG. 4.

In step S11, the reference position Ps is set near the fillet surface 5 outside the first object $4a$. In the case where the fillet surface 5 is formed of an arc having a single radius R1 on a central longitudinal cross-section (a plane through the axis C) of the first object $4a$ as shown in FIG. 5A, it is preferable to set the reference position Ps in the center position of the arc. In the case where the fillet surface 5 is formed of a plurality of arcs having radiuses (R1 and R2) different from each other as shown in FIG. 5B, it is preferable to set the reference position Ps in the center of the arc having a largest radius (R1) in a range in which residual stress is desired to be particularly accurately known. It is also possible to set the reference position Ps, as shown in FIG. 5C, in the center of an arc having largest length in the range in which residual stress is desired to be particularly accurately known (an arc having the radius R1 smaller than the radius R3).

Figure 3:
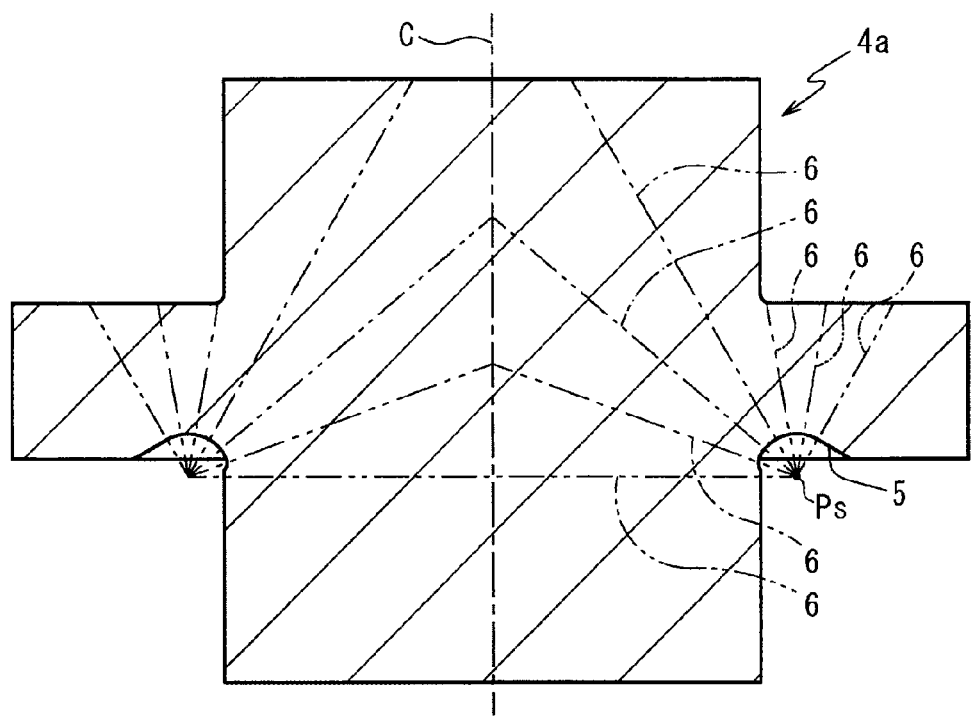
FIG. 3 is a sectional view of an object sliced from the shaft-like member and is a diagram showing cutting surfaces sequentially formed in a successive-cutting and release-strain-measuring process shown in FIG. 1.

Subsequently, in step S12 in FIG. 4, the angle between the adjacent cutting surfaces 6 among the plurality of cutting surfaces 6 shown in FIG. 3 and a total number of the measurement cycles (the number of times of cutting) are determined. The angle between the cutting surfaces 6 adjacent to each other is set such that the distance between the fillet surface 5 and an crossing point of the cutting surfaces 6 is larger than the depth of adjacent grooves in step S16 explained below. The number of measurement cycles is set in accordance with a range in which residual stress is desired to be checked and an angle between the cutting surfaces 6. In the case of using a plurality of first objects 4*a*, making an angle of the cutting surface 6 formed first be different from each other among the plurality of first objects 4*a* equivalent to each other and integrating measurement results of the angle enable an interval of angle of the cutting surfaces 6 in which measurement data is obtained to be substantially reduced. Although the angle between the cutting surfaces 6 shown in FIG. 3 is 20°, the use of two first objects 4*a* enables the measurement result of release strain to be obtained at a 10° interval.

The steps from step S13 to step S19 are repeated by the number of times same as the total number of measurement cycles determined as explained above. In short, the measurement cycle is repeated by the number of times.

Figure 6:
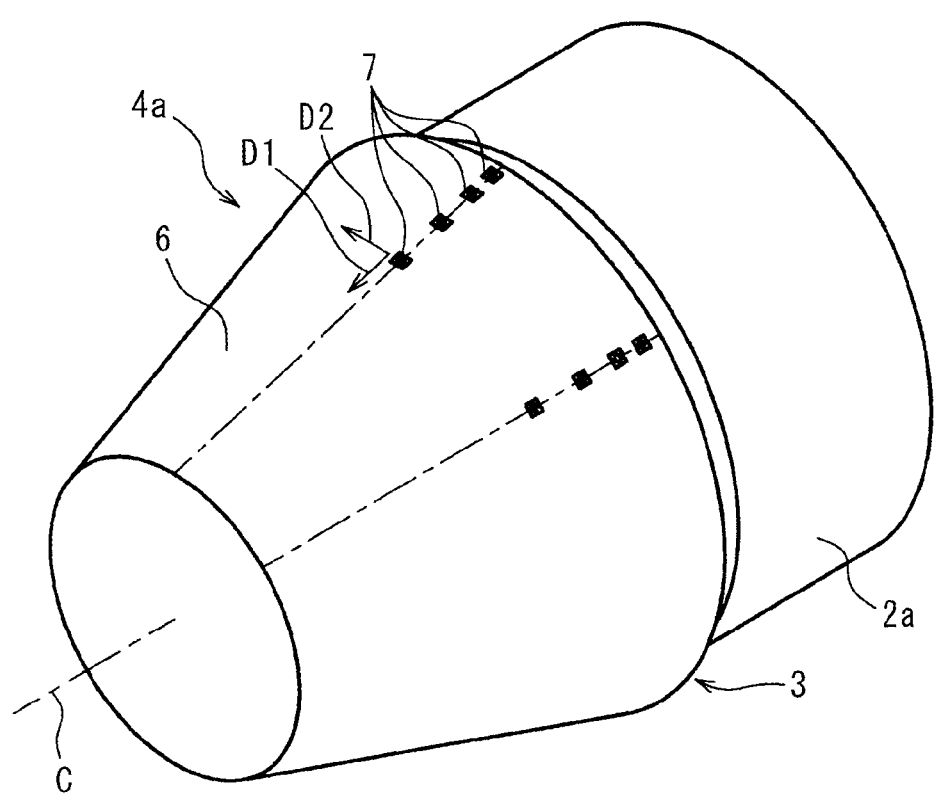
FIG. 6 is a perspective view showing an example of an object onto which a strain gauge is placed in a strain gauge sticking process shown in FIG. 4.

In step S14, a new cutting surface 6 is formed from the conical surface (or the columnar surface) by cutting the first object 4*a*. In step S15, a plurality of first strain gauges 7 shown in FIG. 6 are placed to the cutting surface 6 which is cut anew.

The first strain gauges 7 are placed in respective parts aligned along a ridgeline direction of the cutting surface 6 (the conical or cylindrical surface) (a direction of a straight line included in the conical surface). Desirably, the first strain gauges 7 are placed at a small interval (e.g., 6 mm interval) in a region closer to the fillet surface 5 and the interval is increased with an increase in distance from the fillet surface 5. Since the residual stress and inherent strain in the first object 4*a* which is a solid of revolution are circumferentially uniform as shown in the figure, distributing the first strain gauges 7 into a plurality of circumferentially arranged rows and placing the first strain gauges 7 so as to shift respective positions of the first strain gauges 7 in the ridgeline direction among the rows allows the interval in the ridgeline direction of measurement points to be substantially reduced.

It is preferable to use strain gauges capable of detecting strain in orthogonal two directions, as the first strain gauges 7, and to orient the first strain gauges 7 so as to allow the first strain gauges 7 to detect strains in a ridgeline direction D1 of the cutting surface 6 and a tangential direction (a circumferential direction) D2 orthogonal to the ridgeline direction. As the first strain gauges 7 of two axes capable of being thus arranged, available is, for example, a strain gauge having a base diameter of 4.5 mm, a gauge length of 1 mm, and a gauge width of 0.7 mm is available.

Figure 7:
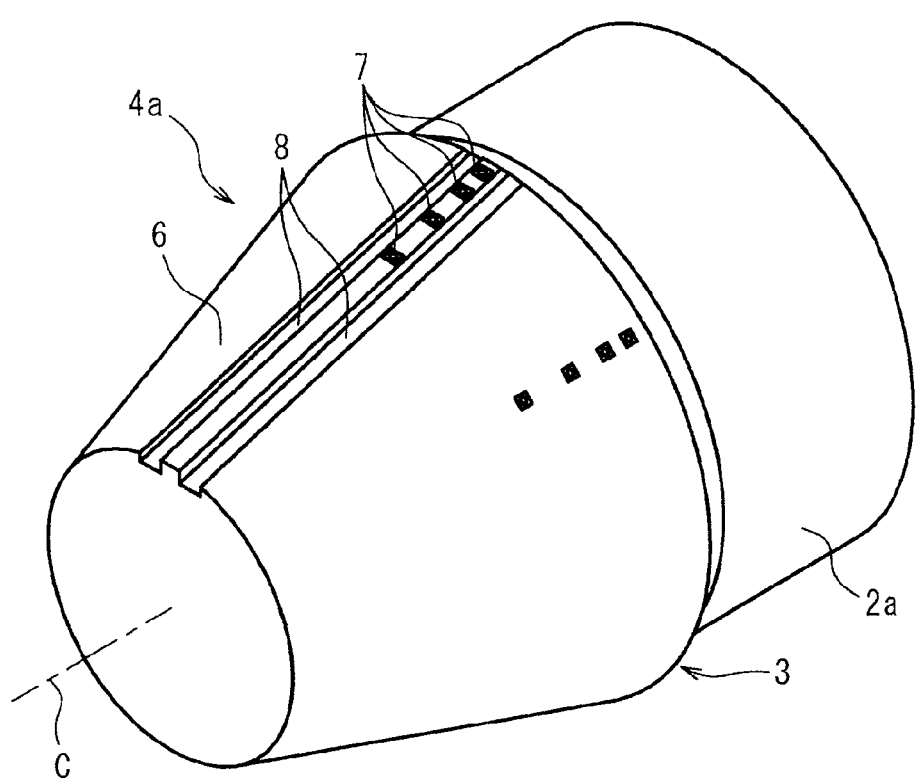
FIG. 7 is a perspective view showing an example of an object in which adjacent grooves are formed in an adjacent groove forming process in FIG. 4.
Figure 8:
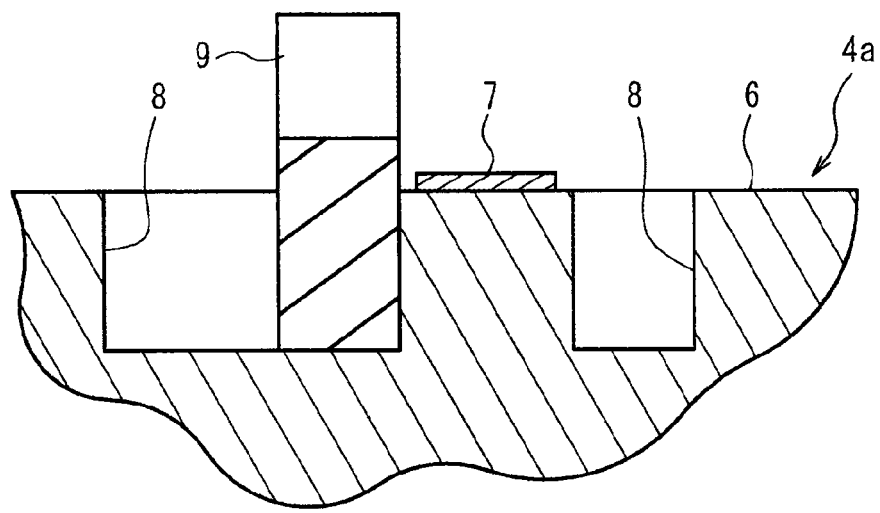
FIG. 8 is a sectional view of the object showing an example of the formation of the adjacent grooves in the adjacent groove forming process shown in FIG. 4.

In step 16 following the placement of the first strain gauges 7, adjacent grooves 8 shown in FIG. 7 are formed along the rows of the first strain gauges 7 arranged in the ridgeline direction. The adjacent grooves 8 can be formed, for example, as shown in FIG. 8, by an end mill 9. The adjacent grooves 8 may be also formed so as to surround the respective first strain gauges 7.

Figure 9:
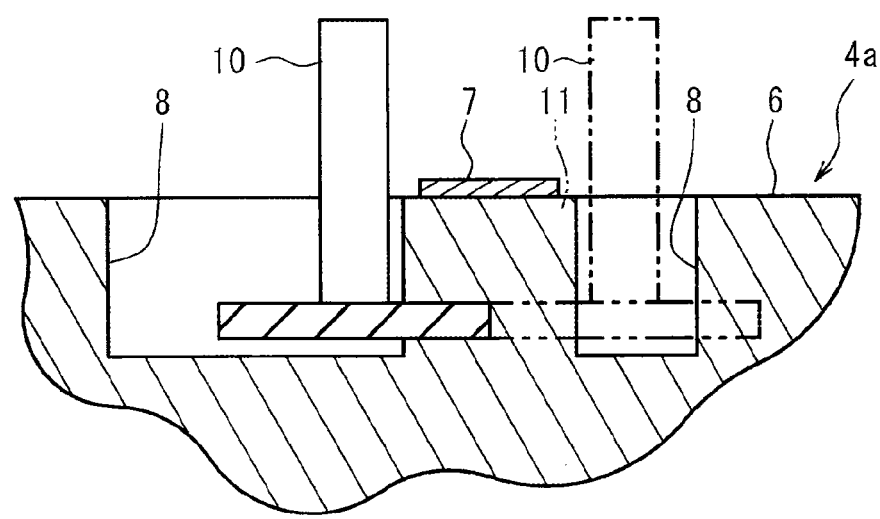
FIG. 9 is a sectional view of the object showing an example of a surface layer separating process shown in FIG. 4.
Figure 10:
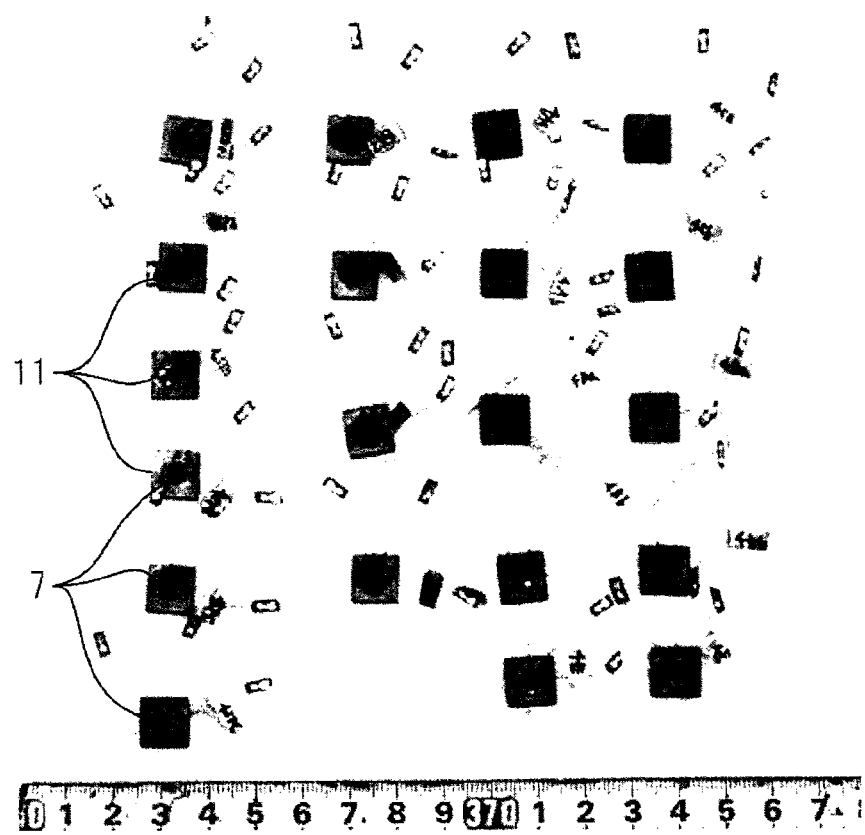
FIG. 10 is a plan view showing an example of small pieces sliced by a layer separating process in FIG. 4.

In step S17, a belt-like surface layer portion including the rows of the first strain gauges 7 is separated from the cutting surface 6. The separation is performed by inserting a tool, for example, a T-slot cutter 10 shown in FIG. 9 into the adjacent grooves 8. The T slot cutter 10 is driven to rotate around a predetermined axis to perform cutting so as to cut a workpiece in a side direction, that is, a rotational radial direction orthogonal to the axis. In an example shown in FIG. 8 and FIG. 9, one of the adjacent grooves 8 on both sides of the first strain gauges 7 has a large width enough to allow the T slot cutter 10 to be inserted into the adjacent groove 8 perpendicularly, that is, in a direction parallel to the rotation axis. Cutting off a lower layer of the first strain gauges 7 from the side direction by the thus inserted T slot cutter 10 allows the belt-like surface layer portion including the rows of the first strain gauges 7 to be separated from the cutting surface 6. Further cutting the belt-like surface layer portion separated into this way in positions among the first strain gauges 7 allows a plurality of small pieces 11 including the first strain gauges 7 respectively to be sliced as shown in FIG. 10. Each of the small pieces 11 has thickness of, for example, approximately 2.3 mm except the first strain gauges 7. Residual stress is released from the small pieces 11 sliced in this way, which causes a release strain in the small pieces 11. The release strain is measured by the first strain gauges 7 in step S18.

In step S19, if the measurement cycle is repeated by the number of times same as the number determined in step S12, the successive-cutting and release-strain-measuring process is completed. If the number of repetition of the measurement cycle is smaller than the determined number of times, the process of step S14 to S18 is further repeated.

<Measurement-Piece-Slicing and Release-Strain-Measurement Process>

Figure 11:
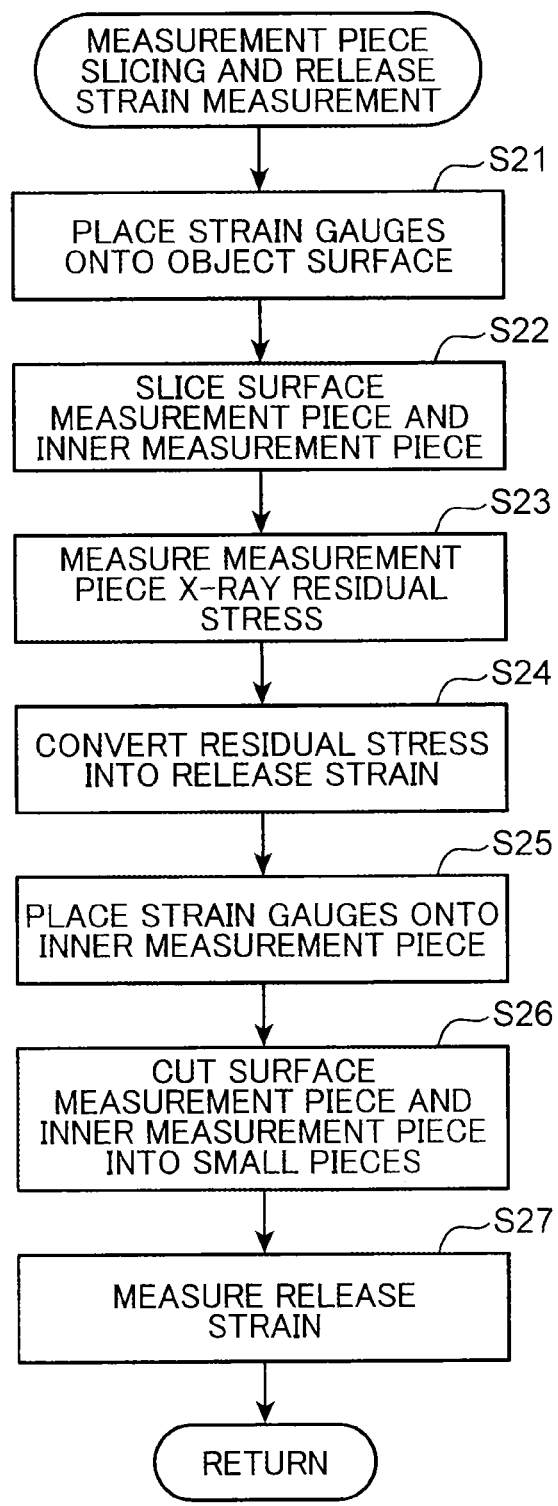
FIG. 11 is a flowchart showing a detailed flow of a measurement-piece-slicing and release-strain-measurement process shown in FIG. 1.

FIG. 11 shows a detailed flow of the process of step S03 in FIG. 1, that is, the measurement-piece-slicing and release-strain-measurement process for slicing measurement pieces and measuring a release strain.

Figure 12:
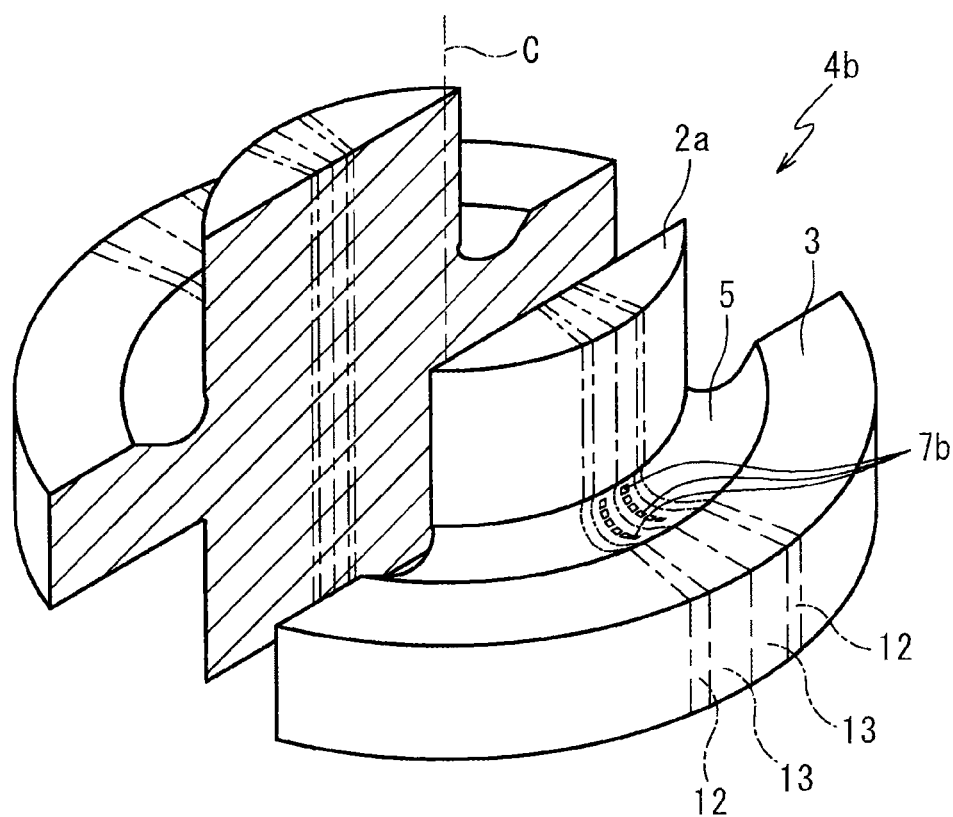
FIG. 12 is a partial sectional perspective view showing a cutting method for an object in a surface measurement piece and inner measurement piece slicing process in FIG. 11.

In the measurement-piece-slicing and release-strain-measurement process, the second object 4*b* is cut, as shown in FIG. 12, to slice inner measurement pieces 12 and surface measurement pieces 13. The inner measurement pieces 12 are subject to the measurement of release strain inside the second object 4*b* by use of a plurality of second strain gauges 7*a* shown in FIG. 13. The surface measurement pieces 13 are subject to the measurement of release strain in the fillet surface 5 with placement of third strain gauges 7*b* onto the fillet surface 5 as shown in FIG. 12.

More specifically, in the measurement-piece-slicing and release-strain-measurement process, the third strain gauges 7*b* shown in FIG. 12 are placed on respective positions in the fillet surface 5 of the second object 4*b*. Each of the placement positions is set so as to locate respective centers of the third strain gauges 7*b* in a plane through the axis C of the shaft section 2*a*. The third strain gauges 7*b* are desirably oriented so as to be capable of detecting both of strain in a direction of the line of the intersection of the surface of the second object 4*b* and the plane through the axis C and strain in a direction orthogonal to the line of the intersection (that is, the circumferential direction D2). In step S22, the second object 4*b* is cut, as shown in FIG. 12, along a plane by a saw, to thereby slice a plurality of inner measurement pieces 12 and a plurality of surface measurement pieces 13.

In the graphically-shown embodiment, each of the inner measurement pieces 12 is defined by two planes (central longitudinal cross-sections) intersecting each other at an angle of 5° at the axis C. The surface measurement pieces 13 are defined by two planes (central longitudinal cross-sections) intersecting each other at an angle of 10° at the axis C. In this embodiment, sliced are two surface measurement pieces 13 adjacent to each other, and one inner measurement piece 12 is sliced from each of both sides of the two surface measurement pieces 13. Although the cutting interval of the object has a physical limit, the inner measurement pieces 12 can be sliced by cutting the center portion of the second object 4b along two cutting surfaces orthogonal to the cutting surface separating the two surface measurement pieces 13 from each other and parallel to the axis C in advance of cutting the second object 4b cut along the central longitudinal cross-section, for slicing the inner measurement pieces 12 and the surface measurement pieces 13. The thus sliced inner measurement pieces 12 and the surface measurement pieces 13 have respective shapes cut off in respective portions on the axis C side.

In step S23, X-ray residual stress measurement is performed by use of the thus sliced inner measurement pieces 12. The X-ray residual stress measurement includes setting a polar coordinate and determining measurement points on the basis of the polar coordinate. The polar coordinate is set so as to correspond to the ridge line of the conical or cylindrical surface forming the cutting surface 6 of the first object 4a in the successive-cutting and release-strain-measuring step, on the central longitudinal cross-section of the inner measurement pieces 12. The measurement points may be spaced at an interval smaller than the interval between the placed first strain gauges 7 (e.g., 0.5 mm).

In step S24, to make use of the residual stress measured in step S23 together with the other measurement values, the residual stress is converted into a value equivalent to release strain.

Figure 13:
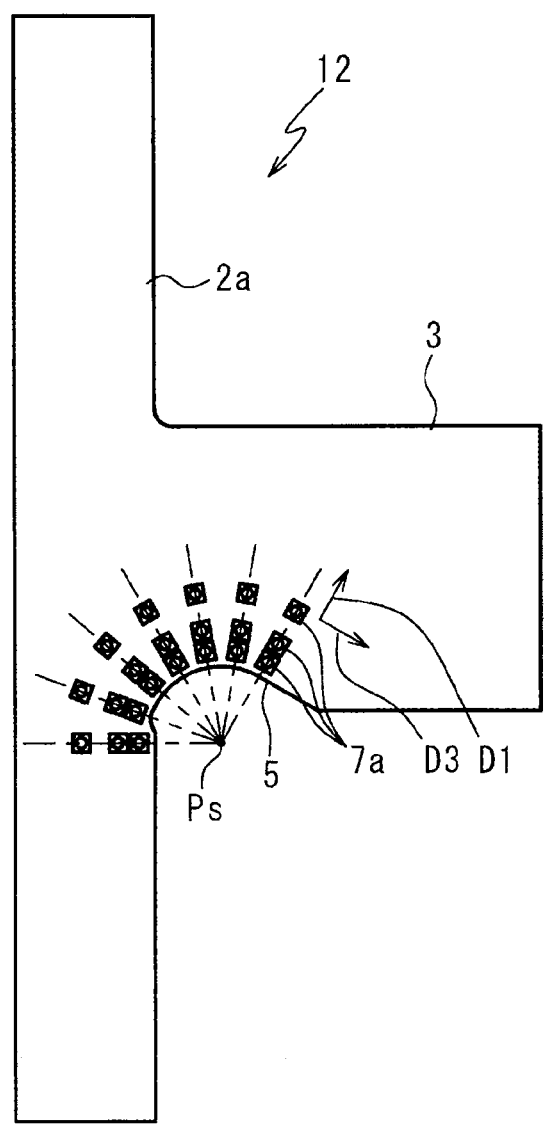
FIG. 13 is a partially enlarged plan view showing a position where a strain gauge is placed in a measurement piece.

Furthermore, in step S25, the plurality of second strain gauges 7a shown in FIG. 13 are arranged and placed onto the inner measurement pieces 12. The second strain gauges 7a are disposed in respective places aligned along a straight line corresponding to the ridgeline of the conical or cylindrical surface forming the cutting surface 6 of the first object 4a in the successive-cutting and release-strain-measuring step. More preferably, the second strain gauges 7a are placed at the same interval as the first strain gauge 7 on the cutting surface 6 of the first object 4a, that is, placed onto respective positions coinciding with respective positions for measurement of release strain in the successive cutting and release strain measurement. The second strain gauges 7a are oriented so as to detect strains in the direction D1 corresponding to the ridgeline of the conical or cylindrical surface forming the cutting surface 6 of the first object 4a and a normal direction D3 of the conical or cylindrical surface form the cutting surface 6 of the first object 4a.

In step S26, the inner measurement pieces 12 and the surface measurement pieces 13 are further cut to thereby release respective residual stresses of the parts including the second strain gauges 7a and the third strain gauges 7b respectively, and, in step S27, the release strains are measured by the second strain gauges 7a and the third strain gauges 7b, respectively.

The measurement of residual stress by use of the X ray in step S23 has theoretically high accuracy and allows the measurement interval to be reduced, while requiring a lot of labor and time for accurate measurement because of great influence of measurement conditions such as surface roughness. On the other hand, the measurement of release strain inside the second object 4b by use of the second strain gauges 7a in step S25 to step S27, while having a limit in the measurement interval dependent on the size of the second strain gauges 7a, can be performed with comparative ease. Hence, in step S27, the use in combination of the value obtained by converting the measurement value of the residual stress measured by use of the X ray into the release strain in step S24 and the measurement value of the release strain measured by use of the second strain gauge 7a in step S25 to step S27 allows accuracy and easiness to be well balanced.

Figure 14:
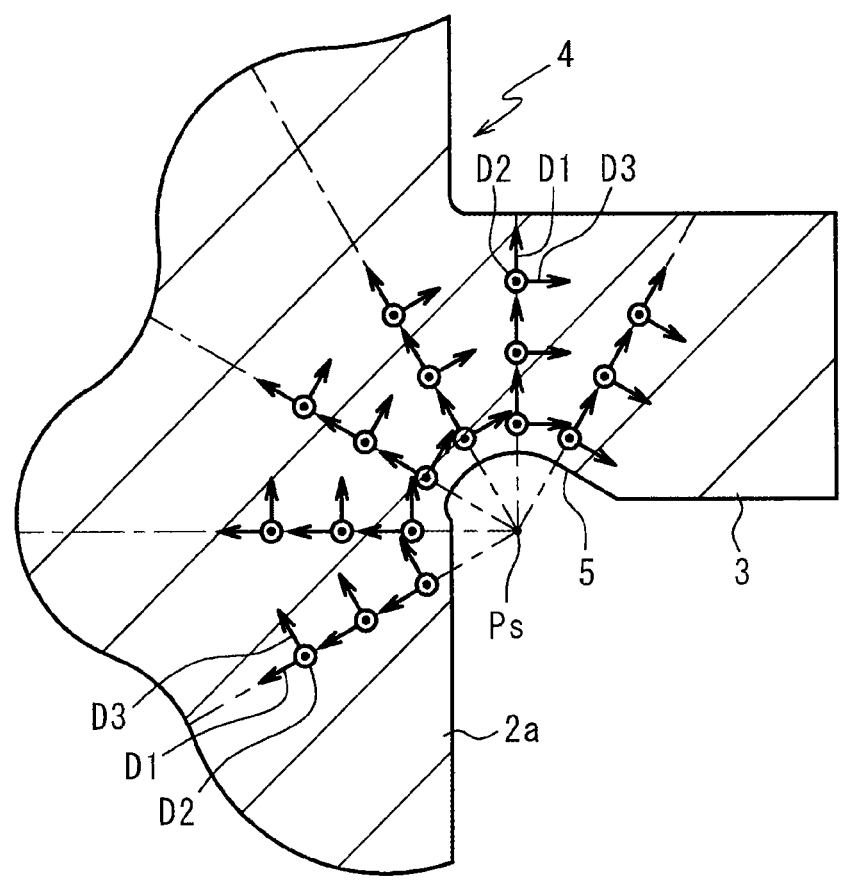
FIG. 14 is a schematic sectional view of a shaft-like member showing a measurement direction for a release strain in the successive-cutting and release-strain-measuring process and the measurement slicing and release strain measuring process in FIG. 1.

As shown in FIG. 14, the following three direction components are measured as measurement data of release strains at the measurement points in the polar coordinate centering on the reference position Ps on the central longitudinal cross-section: a component in the D1 direction which is the ridgeline direction of the cutting surface 6; a component in the D2 direction which is a direction orthogonal to the D1 direction and orthogonal to a coordinate plane (the direction circumferential of the first object 4a and the second object 4b); and a component in the D3 direction orthogonal to each of the D1 direction and the D2 direction in the inner measurement pieces 12. Thus obtaining all of the components of the release strains at the measurement points with respect to the three directions orthogonal to each other allows accuracy of the derivation of an inherent strain to be improved with easy calculation.

<Inherent Strain Derivation Process>

In the inherent strain derivation process, which is step S04 in FIG. 1, the distribution of inherent strain is derived by an inverse analysis by use of the finite element method, on the basis of the data of the release strain obtained in step S03.

The relationship between release strain (elastic strain) and inherent strain is represented by the following Expression (1).

[Math. 1]

$$\{m\varepsilon\} = [H]\{\varepsilon^*\} \quad (1)$$

where, $\{m\varepsilon\}$: release strain (elastic strain)
$\{\varepsilon^*\}$: inherent strain distributed in an object
$[H]$: elastic response matrix representing a relation between $\{m\varepsilon\}$ and $\{\varepsilon^*\}$ The elastic response matrix [H] represents sensitivity of an inherent strain component with respect to a measurement condition (a measurement shape) of the calculated release strain. In other words, the component of the matrix [H] depends on the measurement shape and is calculated by repeated calculation for calculating elastic response at the time when a unit strain is given to respective inherent distortion components.

Besides, the measured release strain always includes an error, which involves the relationship between the most probable value of the inherent strain and the release strain represented by the following Expression (2).

[Math. 2]

$$\{m\varepsilon\} - [\tilde{H}]\{\hat{\varepsilon}^*\} = \{v\} \quad (2)$$

where, $\{\hat{\varepsilon}^*\}$: the most probable value of the inherent strain
$\{v\}$: residual
$[\tilde{H}]$: reduction matrix of [H]

The most probable value of the inherent strain component is uniquely given by the conditions for minimizing the square sum of residuals (a least squares method). In recent years, a method with representation of inherent strain distributed in an object by a function is often applied. The inherent strain distribution can be obtained by calculating a value of a coefficient of the set function rather than directly calculating the inherent strain. In this case, instead of the inherent strain component and the most provable value given by Expression (1) and Expression (2), calculated is a coefficient of the distribution function as an unknown number. The use of such functional representation allows the number of unknown numbers to be greatly reduced.

<Residual Stress Calculation Process>

The residual stress measuring method includes the last process, the residual stress calculation process which is step S05 in FIG. 1, in which the distribution of residual stress is calculated by a direct analysis by use of the finite element method on the basis of the distribution of the inherent stress derived in step S04.

The relationship between residual stress and inherent stress which had originally existed in the object 4 is represented by the following Expression (3).

[Math. 3]

$$\{\sigma\}=[M]\{\varepsilon^*\} \quad (3)$$

where, $\{\sigma\}$: residual stress

[M]: elastic response matrix representing the relation between $\{\varepsilon^*\}$ and $\{\sigma\}$ The elastic response matrix representing the relation between inherent strain and residual stress is derived by a finite element analysis.

<Advantages>

The residual stress measuring method includes: sequentially forming, in the first object 4a, the cutting surfaces 6 formed of the conical or cylindrical surface through the reference position Ps; and slicing the small pieces 11 from cutting surfaces to thereby measure release strains at respective measurement points set on the polar coordinate centered on the reference position Ps on the central longitudinal cross-section, thereby setting a large number of measurement points near the fillet surface 5 inside the first object 4a and measuring strains at the respective measurement points; this allows an in-depth measurement of the residual strain distribution near the fillet surface 5 to be performed.

Furthermore, the residual stress measuring method includes using the inner measurement pieces 12 sliced from the second object 4b by cutting the second object 4b equivalent to the first object 4a along the two central longitudinal cross-sections and measuring, at the measurement points corresponding to the measurement points set concerning the first object 4a, respective release strains in the two directions D1 and D2 and a release strain in the direction D3 orthogonal to the directions D1 and D2 which are measured in the first object 4a. This allows all of orthogonal three-dimensional components to be obtained as data of the release strains in the measurement points, thereby making it possible to measure an accurate inherent strain and accurate residual stress. In the surface of the second object 4b as well, where respective release strains in the direction D2 and the direction orthogonal to the direction D2 are measured, residual stress can be measured in improved accuracy.

Other Embodiments

The embodiment disclosed herein should be considered illustrative in all aspects and not limiting. The scope of the present invention is not limited by the configuration of the embodiment. It is intended that all changes indicated by claims and within a meaning and a range equivalent to claims are included in the scope of the present invention.

The essence of the residual stress measuring method is forming cutting surfaces each formed of a conical or cylindrical surface concentric with an axial portion of an object and through a reference position, and analyzing strains of the cutting surfaces. This allows remaining processes except the essential process to be omitted or replaced with other processes. For example, the measurement performed by use of the inner measurement pieces 12 and the surface measurement pieces 13 is not an essential one. For example, instead of the analysis by the measurement of a release strain performed using the strain gauges 7, nondestructive measurement of strains of the cutting surfaces may be performed by an X-ray diffraction method, a neutron diffraction method, a sound elastic method, or the like.

In the residual stress measuring method, the tool for slicing the small pieces 11 from the cutting surfaces 6 only has to be a tool capable of cutting a workpiece in a rotational radial direction orthogonal to the axis of the tool. A tool such as a V groove cutter may be used instead of the T slot cutter 10.

In the residual stress measuring method, the first object 4a and the second object 4b are not limited to objects sliced from the same shaft-like member 1 and may be objects sliced from separate shaft-like members 1.

Furthermore, the number of first objects 4a and second objects 4b may be optionally increased to make the angle difference of the cutting surfaces 6 be smaller angle.

In the residual stress measuring method, the reference position Ps is not limited to the center of the arc of the fillet surface 5 but only has to be a position allowing an interval of measurement points in a region where in-depth calculation as to residual stress is required (an interval among cutting surfaces to be sequentially formed) to be small.

EXAMPLES

The present invention is explained more in detail below according to examples; however, the present invention is not limited to the examples.

Figure 15:
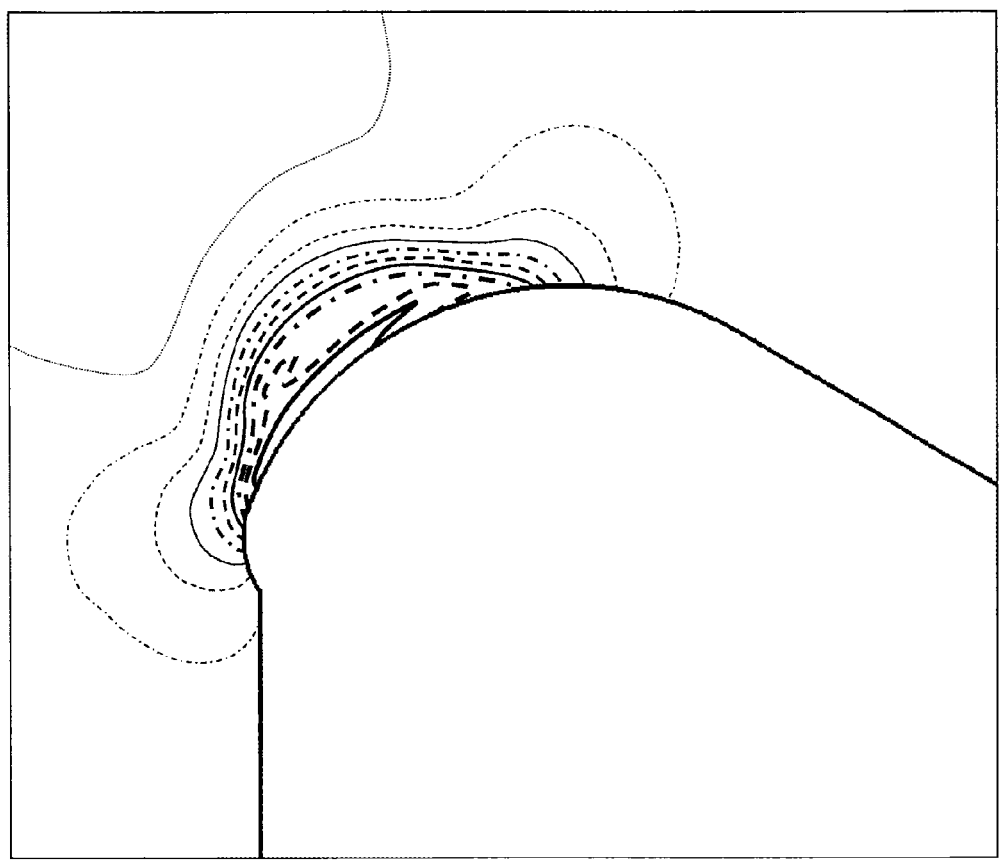
FIG. 15 is a diagram showing a distribution of residual stress measured in an example of the residual stress measuring method in FIG. 1.

FIG. 15 shows a distribution of residual stress measured by the residual stress measuring method on the basis of the embodiment described above, in the central longitudinal cross-section. The measurement uses a first object and a second object, each of which includes a shaft section having a diameter of 280 mm and a tabular section having thickness of 80 mm and a diameter of 500 mm. A fillet surface is provided between the shaft section and the tabular section. The fillet surface includes a main part having a radius of 22 mm.

As shown in FIG. 15, the residual stress measuring method makes it possible to obtain an in-depth distribution of residual stress.

INDUSTRIAL APPLICABILITY

Shaft-like members to which the residual stress measuring method can be applied include, for example, a crank shaft. The residual stress measuring method can be applied naturally by use of a shaft portion of the crank shaft as the shaft section and use of an integrated web of an arm and a counter weight as the tabular section, and also can be applied by use of a pin as the shaft section and use of an arm as the tabular section. The residual stress measuring method can be used also for respective analyses of a variety of structures other than the crank shaft.

As explained above, according to the present invention, provided is a residual stress measuring method capable of accurate measurement of a distribution of residual stress near a fillet surface of an object including a columnar shaft section and a tabular section projecting radially beyond the shaft section, the fillet surface being provided in a portion interconnecting the shaft section and the tabular section.

This method is a method of measuring residual stress in an object that includes a columnar shaft section and a tabular section projecting outward radially beyond an outer circumferential surface of the shaft section over an entire circumference, the object being provided with a fillet surface in a portion interconnecting the shaft section and the tabular section. The method includes repeating a measurement cycle which includes: a step of cutting the object to thereby form a new cutting surface which is a conical or cylindrical surface concentric with an axis of the shaft section, the conical or cylindrical surface being through a reference position which is unchanged in every repeated measurement cycle; and a step of measuring residual stress in a plurality of parts in the cutting surface.

According to the residual stress measuring method, the repeat of forming the cutting surface which is the conical or cylindrical surface through the reference position enables the measurement points near the reference position to be set densely, thereby making it possible to reduce an interval of the measurement points of residual stress to obtain a large number of measurement data. As a result, the residual stress measuring method makes it possible to accurately measure the distribution of a residual stress near the fillet surface.

In the residual stress measuring method, the reference position is desirably a center position of an arc having a largest diameter among arcs included in the fillet surface on the central longitudinal cross-section of the object. Since the center position is the origin of a polar coordinate (a local coordinate) for representing positions of measurement points of a release strain on the central longitudinal cross-section, setting the center of the most dominant arc of the fillet surface as explained above as the reference position enables a large number of measurement points to be disposed near the fillet surface. This allows measurement accuracy of an inherent strain and residual stress to be improved.

In the step of measuring the residual stress on the cutting surface, it is desirable to measure the residual stress in each of a plurality of parts aligned in a ridgeline direction of the conical or cylindrical surface. Setting the plurality of measurement points thus aligned in the ridgeline direction makes it possible to efficiently measure the distribution of the inherent strain of the object substantially over an entire cylindrical or circumferential surface. Respective positions of the plurality of measurement points aligned in the ridgeline direction may be divided in a zigzag shape in the circumferential direction. On the other hand, in the case of the object not shaft-like, circumferentially dispersing the plurality of measurement points aligned in the ridgeline direction of the conical or cylindrical surface allows the distribution of inherent strain of the object over the entire cylindrical surface or circumferential surface to be measured.

In the step of measuring the residual stress on the cutting surface, it is desirable to measure respective components of residual stress with respect to the ridgeline direction of the conical or cylindrical surface and a tangential direction orthogonal to the ridge line. This allows a radius vector direction (a direction of measurement points viewed from the origin) of a polar coordinate related to the arrangement of the measurement points on the central longitudinal cross-section and the measurement direction by strain gauges to be coincide with each other, thus facilitating the analysis.

In the residual stress measuring method, the step of measuring the residual stress on the cutting surface desirably includes a step of placing a strain gauge onto the cutting surface, a step of slicing a small piece including the strain gauge from the cutting surface, and a step of measuring a release strain of the small pieces by use of the strain gauge. The measurement of the release strain enables residual stress to be accurately measured.

In the residual stress measuring method, the step of slicing the small piece desirably includes a step of forming groove adjacent to the strain gauges and a step of inserting, into the groove, a tool driven to rotate around a predetermined rotational axis to perform cutting so as to cut a workpiece in a rotational radial direction orthogonal to the rotation axis and cutting a part on a lower side of the cutting surface with the tool to cut off the part to thereby separate a surface layer of the cutting surface. Slicing the small piece by cutting with use of such a tool allows the cutting groove formed on the surface of the cutting surface to have a reduced depth. This allows an angle difference between the formed cutting surface and the next cutting surface to be reduced, thereby making it possible to densely set the measurement points to improve measurement accuracy of an inherent strain and residual stress.

Besides, it is preferable that the residual stress measuring method further includes a step of measuring residual stress in a second object equivalent to the object and the step of measuring the residual stress in the second object includes: a step of cutting off the second object along two planes through an axis of a shaft section of the second object to thereby obtain a measurement piece defined by the two planes; and a step of measuring residual stress in a plurality of parts located on a straight line corresponding to the ridgeline of the conical or cylindrical surface on the cutting surface of the measurement piece. This makes it possible to further increase measurement points to further improve measurement accuracy of residual stress.

The step of measuring the residual stress in the plurality of parts on the cutting surface of the measurement piece preferably includes measuring respective components of residual stress with respect to a direction corresponding to the ridge line and a direction corresponding to the normal of the conical or cylindrical surface. Making one of measurement directions of residual stress in the measurement piece of the second object be a radius vector direction of a polar coordinate related to arrangement of measurement points facilitates the calculation. Besides, making the other of the measurement directions of the residual stress in the measurement piece of the second object be the direction corresponding to the normal of the cutting surface of the object allows the measure component of residual stress in a direction incapable of being measured on the cutting surface of the object to be measured. The residual stress measuring method thus enables the residual stress to be more accurately measured.

In the residual stress measuring method, the step of measuring the residual stress in the plurality of parts on the cutting surface of the measurement piece desirably includes a step of aligning and placing a plurality of second strain gauges side on a straight line corresponding to the ridgeline of the conical or cylindrical surface on the cutting surface of the measurement piece and a step of further cutting the measurement piece to release residual stress in the measurement piece and thereby measuring release strains by use of the second strain gauges. Thus measuring the release strain also in the second object allows the residual stress to be more accurately measured.

Preferably, the residual stress measuring method further includes a step of measuring residual stress in a plurality of parts on the surface of the second object. Thus measuring residual stress on the outer surface of the second object allows the measurement accuracy of residual stress to be further improved.

The step of measuring the residual stress in the plurality of parts on the surface of the second object preferably includes measuring respective components of residual stress with respect to a direction of a line of intersection of the surface of the second object and a plane through the axis and a direction orthogonal to the line of intersection. The measurement allows one of the measurement directions of residual stress on the surface of the second object to be coincided with a deflection angle direction of a polar coordinate related to arrangement of measurement points, thus facilitating the analysis.

In the residual stress measuring method, the step of measuring the residual stress in the plurality of parts on the surface of the second object desirably includes a step of placing a third strain gauge onto the surface of the second object. Thus measuring the release strain of the outer surface of the second object by use of the third strain gauge in addition to the measurement of the release strain by use of the second strain gauge allows the measurement accuracy of residual stress to be improved.

In the residual stress measuring method, it is preferable that the shaft section of the object and the shaft section of the second object are integrally formed. Sampling the object and the second object from one structure allows the number of samples used in the residual stress measuring method to be reduced.

The invention claimed is:

1. A method of measuring residual stress, comprising repeating a measurement cycle which includes:
   cutting an object that includes a columnar shaft section and a tabular section projecting outward radially beyond an outer circumferential surface of the shaft section over an entire circumference, the object being provided with a fillet surface in a portion interconnecting the shaft section and the tabular section, to thereby form a new cutting surface which is a conical or cylindrical surface concentric with an axis of the shaft section, the conical or cylindrical surface being through a reference position which is unchanged in every repeated measurement cycle; and measuring residual stress in a plurality of parts in the cutting surface.

2. The residual stress measuring method according to claim 1, wherein the reference position is a center position of an arc having a largest diameter among arcs included in the fillet surface on a central longitudinal cross-section of the object.

3. The residual stress measuring method according to claim 1, wherein the measuring the residual stress in the cutting surface includes measuring residual stress in each of a plurality of parts aligned in a ridgeline direction of the conical or cylindrical surface.

4. The residual stress measuring method according to claim 1, wherein the measuring the residual stress in the cutting surface includes measuring respective components of residual stress with respect to a ridgeline direction of the conical or cylindrical surface and a tangential direction orthogonal to the ridge line.

5. The residual stress measuring method according to claim 1, wherein the measuring the residual stress on the cutting surface includes:
   placing a strain gauge onto the cutting surface;
   slicing a small piece including the strain gauge from the cutting surface; and
   measuring a release strain of the small piece by use of the strain gauges.

6. The residual stress measuring method according to claim 5, wherein the slicing the small piece includes:
   forming a groove adjacent to the strain gauge; and
   inserting, into the groove, a tool driven to rotate around a predetermined rotational axis to perform cutting so as to cut a workpiece in a rotational radial direction orthogonal to the rotational axis, and cutting a part on a lower side of the cutting surface with the tool to cut off the part to thereby separate a surface layer of the cutting surface.

7. The residual stress measuring method according to claim 1, further comprising measuring residual stress of a second object equivalent to the object, wherein
   the measuring the residual stress of the second object includes:
   cutting off the second object along two planes through an axis of a shaft section of the second object to thereby obtain a measurement piece defined by the two planes, and
   measuring residual stress in a plurality of parts located on a straight line corresponding to a ridgeline of the conical or cylindrical surface in a cutting surface of the measurement piece.

8. The residual stress measuring method according to claim 7, wherein the measuring the residual stress in the plurality of parts on the cutting surface of the measurement piece includes measuring respective components of residual stress with respect to a direction corresponding to the ridge line and a direction corresponding to the normal of the conical or cylindrical surface.

9. The residual stress measuring method according to claim 7, wherein the measuring the residual stress in the plurality of parts on the cutting surface of the measurement piece includes:
   aligning and placing a plurality of second strain gauges on a straight line corresponding to the ridgeline of the conical or cylindrical surface in the cutting surface of the measurement piece; and
   further cutting the measurement piece to release residual stress of the measurement piece and thereby measuring respective release strains by use of the second strain gauges.

10. The residual stress measuring method according to claim 7, further comprising measuring residual stress in a plurality of parts in a surface of the second object.

11. The residual stress measuring method according to claim 10, wherein the measuring the residual stress in the plurality of parts on the surface of the second object includes measuring respective components of residual stress with respect to a direction of a line of intersection of the surface of the second object and a plane through the axis and a direction orthogonal to the line of intersection.

12. The residual stress measuring method according to claim 10, wherein the measuring the residual stress in the plurality of parts on the surface of the second object includes a step of placing a third strain gauge onto a surface of the second object.

13. The residual stress measuring method according to claim 7, wherein the shaft section of the object and the shaft section of the second object are integrally formed.

14. The residual stress measuring method according to claim 1, wherein the cutting surface in at least one of the repeated measurement cycles is a conical surface.

* * * * *